(12) United States Patent
Chacko et al.

(10) Patent No.: US 10,703,131 B2
(45) Date of Patent: Jul. 7, 2020

(54) NON-PVC FILM AND NON-PVC FILM LAMINATE (71) Applicant: Avery Dennison Corporation, Pasadena, CA (US)

(72) Inventors: Sujith Chacko, Alhambra, CA (US); Frank Y. Shih, Arcadia, CA (US); Chad Cummings, Reminderville, OH (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/028,492

(22) Filed: Sep. 16, 2013

(65) Prior Publication Data

US 2014/0017433 A1     Jan. 16, 2014

Related U.S. Application Data

(63) Continuation of application No. 13/040,642, filed on Mar. 4, 2011, now abandoned.

(Continued)

(51) Int. Cl.
*B44F 1/06* (2006.01)
*B32B 27/40* (2006.01)
(Continued)

(52) U.S. Cl.
CPC .............. *B44F 1/066* (2013.01); *B32B 7/12* (2013.01); *B32B 27/00* (2013.01); *B32B 27/08* (2013.01);
(Continued)

(58) Field of Classification Search
CPC ... B44F 1/066; G09F 3/10; G09F 3/02; B32B 27/08; B32B 27/308; B32B 27/40; B32B 7/12; B32B 7/14
See application file for complete search history.

(56) References Cited

U.S. PATENT DOCUMENTS 3,351,573 A    11/1967  Skreckoski
3,684,758 A    8/1972   Deiterich
(Continued)

FOREIGN PATENT DOCUMENTS

CN    1090032      9/2002
CN    1537142      10/2004
(Continued)

OTHER PUBLICATIONS

International Search Report and Written Opinion dated Jul. 21, 2011 issued in corresponding International Application No. PCT/US2011/027154 filed Mar. 4, 2011.
(Continued)

*Primary Examiner* — Scott R. Walshon (57) ABSTRACT

A non-PVC film and film laminate includes a first layer including a polyurethane, a polyurethane-acrylic copolymer, a polyurethane-acrylic blend, and a urethane-acrylic hybrid polymer; and a second layer including a non-polyvinylchloride (non-PVC) based polymer. The film and laminate may be suitable for use in marketing, advertising campaigns, particularly outdoor or other environment impacted promotions, and safety applications. The film and laminate may be transparent, translucent, clear or have other desirable optical properties.

27 Claims, 3 Drawing Sheets

Related U.S. Application Data (60) Provisional application No. 61/310,378, filed on Mar. 4, 2010.

(51) Int. Cl.
| | | |
|---|---|---|
| *G09F 3/10* | (2006.01) | |
| *B32B 27/00* | (2006.01) | |
| *B32B 7/12* | (2006.01) | |
| *B32B 27/30* | (2006.01) | |
| *B32B 27/08* | (2006.01) | |

(52) U.S. Cl.
CPC ............ *B32B 27/308* (2013.01); *B32B 27/40* (2013.01); *G09F 3/10* (2013.01); *B32B 2270/00* (2013.01); *B32B 2307/406* (2013.01); *B32B 2307/412* (2013.01); *B32B 2307/414* (2013.01); *B32B 2307/50* (2013.01); *B32B 2307/54* (2013.01); *B32B 2307/546* (2013.01); *B32B 2307/584* (2013.01); *B32B 2307/71* (2013.01); *B32B 2307/712* (2013.01); *B32B 2307/732* (2013.01); *B32B 2307/75* (2013.01); *B32B 2413/00* (2013.01); *B32B 2451/00* (2013.01); *B32B 2457/00* (2013.01); *B32B 2519/00* (2013.01); *B32B 2553/00* (2013.01); *B32B 2605/00* (2013.01); *Y10T 428/1476* (2015.01); *Y10T 428/24802* (2015.01); *Y10T 428/2848* (2015.01); *Y10T 428/31551* (2015.04)

(56) References Cited

U.S. PATENT DOCUMENTS

| | | |
|---|---|---|
| 3,843,478 A | 10/1974 | Zuscik et al. |
| 3,870,521 A | 3/1975 | Mackey et al. |
| 4,069,186 A | 1/1978 | Ramig |
| 4,108,819 A | 8/1978 | Oyamada et al. |
| 4,198,330 A | 4/1980 | Kaizerman et al. |
| 4,416,749 A | 11/1983 | Mahr et al. |
| 4,436,520 A | 3/1984 | Lipko et al. |
| 4,532,189 A | 7/1985 | Mueller |
| 4,644,030 A | 2/1987 | Loewrigkeit et al. |
| 4,921,759 A | 5/1990 | Orain et al. |
| 4,935,470 A | 6/1990 | Tanuma et al. |
| 4,978,436 A | 12/1990 | Kelly |
| 4,983,461 A | 1/1991 | Daude et al. |
| 4,983,662 A | 1/1991 | Overbeek et al. |
| 5,030,505 A | 7/1991 | Dickinson |
| 5,041,517 A | 8/1991 | Vu et al. |
| 5,051,295 A | 9/1991 | Mori et al. |
| 5,060,981 A | 10/1991 | Fossum et al. |
| 5,102,737 A | 4/1992 | Josephy et al. |
| 5,104,928 A | 4/1992 | Craun et al. |
| 5,116,442 A | 5/1992 | Daude et al. |
| 5,120,154 A | 6/1992 | Lasch et al. |
| 5,135,797 A | 8/1992 | Sasaki et al. |
| 5,254,394 A | 10/1993 | Bothe et al. |
| 5,290,842 A | 3/1994 | Sasaki et al. |
| 5,306,374 A * | 4/1994 | Hambright ............... D06Q 1/12 156/230 |
| 5,314,713 A | 5/1994 | Mori et al. |
| 5,324,467 A | 6/1994 | Anderson, II |
| 2,364,435 A | 12/1994 | Foster et al. |
| 5,376,430 A | 12/1994 | Swenson et al. |
| 5,420,195 A | 5/1995 | Mayer et al. |
| 5,422,189 A | 6/1995 | Warner et al. |
| 5,436,073 A | 7/1995 | Williams et al. |
| 5,458,935 A | 10/1995 | Alzner |
| 5,468,532 A | 11/1995 | Ho et al. |
| 5,480,705 A | 1/1996 | Tolliver et al. |
| 5,486,426 A | 1/1996 | McGee et al. |
| 5,494,980 A | 2/1996 | Buter et al. |
| 5,508,105 A | 4/1996 | Orensteen et al. |
| 5,558,913 A | 9/1996 | Sasaki et al. |
| 5,562,962 A | 10/1996 | Tung |
| 5,567,761 A | 10/1996 | Song |
| 5,571,861 A | 11/1996 | Klein et al. |
| 5,578,669 A | 11/1996 | Odawa et al. |
| 5,585,193 A | 12/1996 | Josephy et al. |
| 5,593,785 A | 1/1997 | Mayo et al. |
| 5,594,065 A | 1/1997 | Tien et al. |
| 5,612,107 A | 3/1997 | Sangani et al. |
| 5,623,016 A | 4/1997 | Klein et al. |
| 5,643,669 A | 7/1997 | Tsuei |
| 5,662,997 A | 9/1997 | Onishi et al. |
| 5,672,413 A | 9/1997 | Taylor et al. |
| 5,688,573 A | 11/1997 | Goeb et al. |
| 5,691,425 A | 11/1997 | Klein et al. |
| 5,700,582 A | 12/1997 | Sargeant et al. |
| 5,702,790 A | 12/1997 | Liebe et al. |
| 5,712,044 A | 1/1998 | Fanselow et al. |
| 5,721,086 A | 2/1998 | Emslander et al. |
| 5,728,430 A | 3/1998 | Sartor et al. |
| 5,755,929 A | 5/1998 | Kuroyama et al. |
| 5,766,744 A | 6/1998 | Fanselow et al. |
| 5,783,303 A | 7/1998 | Tsuei |
| 5,798,123 A | 8/1998 | Cleckner et al. |
| 5,837,375 A | 11/1998 | Brault et al. |
| 5,849,419 A | 12/1998 | Josephy et al. |
| 5,853,899 A | 12/1998 | Anderson et al. |
| 5,856,010 A | 1/1999 | Furuya et al. |
| 5,866,248 A | 2/1999 | Dressler |
| 5,873,607 A * | 2/1999 | Waggoner ............. G09F 3/0289 283/101 |
| 5,882,388 A | 3/1999 | Adair et al. |
| 5,888,615 A | 3/1999 | Mascarenhas et al. |
| 5,888,635 A | 3/1999 | Yang et al. |
| 5,902,673 A | 5/1999 | Missell et al. |
| 5,955,512 A | 9/1999 | Numazawa et al. |
| 5,981,045 A | 11/1999 | Kuwabara et al. |
| 6,001,916 A | 12/1999 | Walker et al. |
| 6,022,925 A | 2/2000 | Tomko et al. |
| 6,025,068 A | 2/2000 | Pekala |
| 6,031,041 A | 2/2000 | Chung et al. |
| 6,033,514 A | 3/2000 | Davis et al. |
| 6,040,035 A | 3/2000 | Satoh et al. |
| 6,045,648 A | 4/2000 | Palmgren et al. |
| 6,045,920 A | 4/2000 | Ou-Yang et al. |
| 6,063,858 A | 5/2000 | Daniels et al. |
| 6,074,747 A | 6/2000 | Scholz et al. |
| 6,077,648 A | 6/2000 | Nair et al. |
| 6,087,001 A | 7/2000 | Jacquemet et al. |
| 6,093,451 A | 7/2000 | Sandlin et al. |
| 6,096,425 A | 8/2000 | Smith |
| 6,106,982 A | 8/2000 | Mientus et al. |
| 6,110,570 A | 8/2000 | Paleari et al. |
| 6,114,021 A | 9/2000 | Pankratz et al. |
| 6,132,858 A | 10/2000 | Kloos |
| 6,143,408 A | 11/2000 | Fujita |
| 6,146,770 A | 11/2000 | Sargeant et al. |
| 6,150,013 A | 11/2000 | Balaji et al. |
| 6,152,115 A | 11/2000 | Busato et al. |
| 6,153,288 A | 11/2000 | Shih et al. |
| 6,156,403 A | 12/2000 | Cochran |
| 6,159,605 A | 12/2000 | Hanada et al. |
| 6,165,593 A | 12/2000 | Brault et al. |
| 6,171,681 B1 | 1/2001 | Mascarenhas et al. |
| 6,177,187 B1 | 1/2001 | Niemoller et al. |
| 6,194,061 B1 | 2/2001 | Satoh et al. |
| 6,207,361 B1 | 3/2001 | Greener et al. |
| 6,218,455 B1 | 4/2001 | Smith et al. |
| 6,225,381 B1 | 5/2001 | Sharma et al. |
| 6,228,486 B1 | 5/2001 | Kittel et al. |
| 6,239,209 B1 | 5/2001 | Yang et al. |
| 6,258,441 B1 | 7/2001 | Oguchi et al. |
| 6,258,918 B1 * | 7/2001 | Ho ........................ B32B 7/12 528/58 |
| 6,261,670 B1 | 7/2001 | Hakomori et al. |
| 6,270,912 B1 | 8/2001 | Peet |
| 6,280,027 B1 | 8/2001 | Lawrence et al. |
| 6,316,120 B1 | 11/2001 | Emslander |
| 6,329,060 B1 | 12/2001 | Barkac et al. |

(56) References Cited

U.S. PATENT DOCUMENTS

| | | | |
|---|---|---|---|
| 6,355,345 B1 | 3/2002 | Furuya et al. |
| 6,358,660 B1 | 3/2002 | Agler et al. |
| 6,379,813 B1 | 4/2002 | Anderson et al. |
| 6,383,644 B2 | 5/2002 | Fuchs |
| 6,391,415 B1 | 5/2002 | McCurry et al. |
| 6,395,209 B2 | 5/2002 | Yoshida et al. |
| 6,403,202 B2 | 6/2002 | Gu et al. |
| 6,403,223 B1 | 6/2002 | Albro et al. |
| 6,410,200 B1 | 6/2002 | Williams et al. |
| 6,428,895 B1 | 8/2002 | Reihs et al. |
| 6,436,496 B1 | 8/2002 | Rackovan et al. |
| 6,447,883 B1 | 9/2002 | Chen et al. |
| 6,451,908 B1 | 9/2002 | Koonce et al. |
| 6,461,706 B1 | 10/2002 | Freedman et al. |
| 6,461,722 B1 | 10/2002 | Kittel et al. |
| 6,495,628 B1 | 12/2002 | Origuchi et al. |
| 6,509,075 B1 | 1/2003 | McCurry et al. |
| 6,509,097 B1 | 1/2003 | Hatakeyama et al. |
| 6,521,325 B1 | 2/2003 | Engle et al. |
| 6,531,216 B1 * | 3/2003 | Williams ............... B32B 27/08 427/146 |
| 6,541,101 B1 | 4/2003 | Cook et al. |
| 6,552,115 B1 | 4/2003 | Zecha et al. |
| 6,555,213 B1 | 4/2003 | Koneripalli et al. |
| 6,555,240 B1 | 4/2003 | Nishikori et al. |
| 6,566,024 B1 | 5/2003 | Bourdelais et al. |
| 6,573,011 B1 * | 6/2003 | Nair et al. .................... 430/14 |
| 6,589,636 B2 | 7/2003 | Emslander et al. |
| 6,592,700 B2 | 7/2003 | Wang et al. |
| 6,599,593 B1 | 7/2003 | Niu et al. |
| 6,617,008 B1 | 9/2003 | Kono et al. |
| 6,630,049 B2 | 10/2003 | Hannington et al. |
| 6,632,485 B1 | 10/2003 | Tang et al. |
| 6,641,879 B1 | 11/2003 | Matsuura et al. |
| 6,649,260 B2 | 11/2003 | Kumano et al. |
| 6,663,947 B2 | 12/2003 | Freedman et al. |
| 6,667,093 B2 | 12/2003 | Yuan et al. |
| 6,673,453 B2 | 1/2004 | Beavers et al. |
| 6,713,166 B2 | 3/2004 | Yamamoto |
| 6,723,433 B2 | 4/2004 | Bacon, Jr. |
| 6,723,773 B2 | 4/2004 | Williams et al. |
| 6,726,969 B1 | 4/2004 | Balaji et al. |
| 6,726,981 B1 | 4/2004 | Steinbeck et al. |
| 6,740,465 B2 | 5/2004 | Liang et al. |
| 6,743,523 B1 | 6/2004 | Woo et al. |
| 6,755,350 B2 | 6/2004 | Rochford et al. |
| 6,759,121 B2 | 7/2004 | Alahapperuma et al. |
| 6,761,969 B2 | 7/2004 | Li et al. |
| 6,773,804 B2 | 8/2004 | Enlow et al. |
| 6,786,994 B2 | 9/2004 | Williams et al. |
| 6,790,491 B2 | 9/2004 | Sebastian et al. |
| 6,790,516 B2 | 9/2004 | Niepelt |
| 6,793,859 B2 | 9/2004 | Emslander et al. |
| 6,793,860 B2 | 9/2004 | Xing et al. |
| 6,794,466 B2 | 9/2004 | Zecha et al. |
| 6,800,341 B2 | 10/2004 | Emslander et al. |
| 6,808,822 B2 | 10/2004 | Rajan et al. |
| 6,811,857 B1 | 11/2004 | Bravet et al. |
| 6,821,583 B2 | 11/2004 | Shouldice et al. |
| 6,830,803 B2 | 12/2004 | Vaidya et al. |
| 6,841,204 B2 | 1/2005 | Nakamura et al. |
| 6,846,075 B2 | 1/2005 | Ylitalo et al. |
| 6,846,524 B2 | 1/2005 | Ozawa et al. |
| 6,857,737 B2 | 2/2005 | Emslander et al. |
| 6,866,383 B2 | 3/2005 | Naik et al. |
| 6,866,904 B2 | 3/2005 | Nellis et al. |
| 6,875,487 B1 | 4/2005 | Williams et al. |
| 6,881,458 B2 | 4/2005 | Ludwig et al. |
| 6,881,704 B2 | 4/2005 | Sakamoto et al. |
| 6,896,944 B2 | 5/2005 | Ylitalo et al. |
| 6,911,239 B2 | 6/2005 | King et al. |
| 6,919,113 B2 | 7/2005 | Therrian et al. |
| 6,953,624 B2 | 10/2005 | Bacon, Jr. |
| 6,969,483 B1 | 11/2005 | Woo et al. |
| 6,986,919 B2 | 1/2006 | Hladik et al. |
| 6,989,192 B2 | 1/2006 | Huseman et al. |
| 6,989,418 B2 | 1/2006 | Ko et al. |
| 6,989,715 B2 | 1/2006 | Yin |
| 7,014,910 B2 * | 3/2006 | Rochford et al. ......... 428/195.1 |
| 7,022,385 B1 | 4/2006 | Nasser |
| 7,025,453 B2 | 4/2006 | Ylitalo et al. |
| 7,045,199 B2 | 5/2006 | Yamamoto et al. |
| 7,097,298 B2 | 8/2006 | Sondergeld et al. |
| 7,147,923 B2 | 12/2006 | Roberts et al. |
| 7,157,133 B2 | 1/2007 | Moran |
| 7,166,156 B2 | 1/2007 | Parrinello et al. |
| 7,166,649 B2 | 1/2007 | Day et al. |
| 7,179,521 B2 | 2/2007 | Arthurs et al. |
| 7,205,029 B2 | 4/2007 | Ohrbom et al. |
| 7,223,468 B2 | 5/2007 | Yamamoto et al. |
| 7,291,372 B2 | 11/2007 | Otsuki et al. |
| 7,326,462 B2 | 2/2008 | Ishiguro et al. |
| 7,332,205 B2 | 2/2008 | Hannington et al. |
| 7,344,618 B2 | 3/2008 | Hannington et al. |
| 7,358,295 B2 | 4/2008 | Miller et al. |
| 7,371,465 B2 | 5/2008 | Pellingra et al. |
| 7,384,672 B2 | 6/2008 | Chang et al. |
| 7,402,341 B2 | 7/2008 | Halahmi |
| 7,410,692 B2 | 8/2008 | Koda et al. |
| 7,476,705 B2 | 1/2009 | Pajerski |
| 7,534,479 B2 | 5/2009 | Utz et al. |
| 7,569,272 B2 | 8/2009 | Ohrui et al. |
| 7,582,698 B2 | 9/2009 | Lubnin et al. |
| 7,588,812 B1 | 9/2009 | Patel et al. |
| 7,641,947 B2 | 1/2010 | Chen et al. |
| 7,655,296 B2 | 2/2010 | Haas et al. |
| 7,678,959 B2 | 3/2010 | Okada et al. |
| 7,691,784 B2 | 4/2010 | Yuki et al. |
| 7,691,948 B2 | 4/2010 | Takamatsu et al. |
| 7,700,188 B2 | 4/2010 | Balaji et al. |
| 7,799,851 B2 | 9/2010 | Hladik et al. |
| 7,872,069 B2 | 1/2011 | Xia et al. |
| 7,906,218 B2 | 3/2011 | Steichen et al. |
| 7,910,519 B2 | 3/2011 | Majumdar et al. |
| 7,935,398 B2 | 5/2011 | Park et al. |
| 7,951,457 B2 | 5/2011 | Casteren Van et al. |
| 7,968,183 B2 | 6/2011 | Takada et al. |
| 7,972,681 B2 | 7/2011 | Roys et al. |
| 8,002,938 B2 * | 8/2011 | Elwakil ............ B32B 17/10036 101/491 |
| 8,003,176 B2 | 8/2011 | Ylitalo et al. |
| 8,088,847 B2 | 1/2012 | Numrich et al. |
| 8,114,485 B1 | 2/2012 | Schwendimann et al. |
| 8,796,351 B2 | 8/2014 | Koch |
| 9,240,131 B2 | 1/2016 | Onderisin et al. |
| 9,636,938 B2 | 5/2017 | Owusu et al. |
| 2001/0051265 A1 | 12/2001 | Williams et al. |
| 2002/0009576 A1 | 1/2002 | Fu et al. |
| 2002/0011306 A1 | 1/2002 | Hannington et al. |
| 2002/0039642 A1 | 4/2002 | Inoue et al. |
| 2002/0098327 A1 | 7/2002 | Ohta et al. |
| 2002/0146544 A1 | 10/2002 | Kronzer |
| 2002/0164455 A1 | 11/2002 | Nishikawa et al. |
| 2002/0177669 A1 | 11/2002 | Jenny et al. |
| 2003/0049415 A1 | 3/2003 | Pedginski et al. |
| 2003/0050379 A1 | 3/2003 | Shih et al. |
| 2003/0060574 A1 | 3/2003 | Muller et al. |
| 2003/0096087 A1 | 5/2003 | Benanati et al. |
| 2003/0099827 A1 | 5/2003 | Shih et al. |
| 2003/0121600 A1 | 7/2003 | Loncar, Jr. et al. |
| 2003/0157276 A1 | 8/2003 | Romano, Jr. |
| 2003/0170405 A1 | 9/2003 | Parrinello et al. |
| 2003/0180541 A1 | 9/2003 | Naik et al. |
| 2003/0207051 A1 | 11/2003 | Kozumi |
| 2004/0001135 A1 | 1/2004 | Soga |
| 2004/0048073 A1 | 3/2004 | Bacon, Jr. |
| 2004/0058133 A1 | 3/2004 | Bilodeau |
| 2004/0076804 A1 | 4/2004 | Kijima et al. |
| 2004/0091645 A1 | 5/2004 | Heederik et al. |
| 2004/0105940 A1 | 6/2004 | Parrinello et al. |
| 2004/0105971 A1 | 6/2004 | Parrinello et al. |
| 2004/0105994 A1 | 6/2004 | Lu et al. |
| 2004/0197572 A1 | 10/2004 | Bell |
| 2004/0202840 A1 | 10/2004 | Do et al. |

(56) References Cited

U.S. PATENT DOCUMENTS

| | | |
|---|---|---|
| 2004/0241352 A1 | 12/2004 | Shih et al. |
| 2005/0008794 A1 | 1/2005 | Graczyk et al. |
| 2005/0019508 A1 | 1/2005 | Engel et al. |
| 2005/0048303 A1 | 3/2005 | Henderson et al. |
| 2005/0084788 A1 | 4/2005 | Yau et al. |
| 2005/0100687 A1 | 5/2005 | Dutton et al. |
| 2005/0136263 A1 | 6/2005 | Roberts et al. |
| 2005/0147807 A1 | 7/2005 | Haas et al. |
| 2005/0244657 A1 | 11/2005 | Kawamura et al. |
| 2006/0001725 A1 | 1/2006 | Nagata et al. |
| 2006/0014022 A1 | 1/2006 | Kendig et al. |
| 2006/0019073 A1 | 1/2006 | Kinley et al. |
| 2006/0160949 A1 | 7/2006 | Styranec et al. |
| 2006/0204689 A1 | 9/2006 | Tsukamoto et al. |
| 2006/0234075 A1 | 10/2006 | Watanabe |
| 2006/0263564 A1 | 11/2006 | Steyaert |
| 2006/0292317 A1 | 12/2006 | Parrinello et al. |
| 2007/0048466 A1 | 3/2007 | Huynh |
| 2007/0077421 A1 | 4/2007 | Grefenstein et al. |
| 2007/0125490 A1* | 6/2007 | Elwakil ............ B32B 17/10036 156/277 |
| 2007/0136973 A1 | 6/2007 | Patel et al. |
| 2007/0148444 A1 | 6/2007 | Kamiya et al. |
| 2007/0172608 A1 | 7/2007 | Tojo et al. |
| 2007/0172609 A1 | 7/2007 | Williams |
| 2007/0172636 A1 | 7/2007 | Smith et al. |
| 2007/0196647 A1 | 8/2007 | Yokohama et al. |
| 2008/0026182 A1 | 1/2008 | Abe et al. |
| 2008/0057251 A1 | 3/2008 | Griswold et al. |
| 2008/0085385 A1 | 4/2008 | Ylitalo et al. |
| 2008/0166507 A1 | 7/2008 | Park et al. |
| 2008/0199704 A1 | 8/2008 | Ho et al. |
| 2008/0280111 A1 | 11/2008 | Blackwell et al. |
| 2008/0286576 A1* | 11/2008 | McGuire, Jr. ....... B29C 37/0025 428/412 |
| 2008/0302470 A1 | 12/2008 | Sumita et al. |
| 2009/0017299 A1 | 1/2009 | Shimbo et al. |
| 2009/0047449 A1 | 2/2009 | Snow |
| 2009/0214837 A1 | 8/2009 | Albenice et al. |
| 2009/0233067 A1 | 9/2009 | Doornheim et al. |
| 2009/0269568 A1 | 10/2009 | Kuhlmann et al. |
| 2009/0286033 A1 | 11/2009 | Taghavi et al. |
| 2009/0297820 A1 | 12/2009 | Kovalchuk et al. |
| 2009/0317572 A1 | 12/2009 | Abe et al. |
| 2010/0009108 A1 | 1/2010 | Shih |
| 2010/0048077 A1 | 2/2010 | Ko et al. |
| 2010/0051200 A1 | 3/2010 | Mueller et al. |
| 2010/0058656 A1 | 3/2010 | Chevalier et al. |
| 2010/0065212 A1 | 3/2010 | Husemann et al. |
| 2010/0104872 A1 | 4/2010 | Lu |
| 2010/0112263 A1 | 5/2010 | Lorence et al. |
| 2010/0143615 A1 | 6/2010 | Hsu |
| 2010/0215880 A1 | 8/2010 | Chu et al. |
| 2010/0243151 A1 | 9/2010 | Stokes |
| 2011/0009561 A1 | 1/2011 | Pajerski et al. |
| 2011/0012974 A1 | 1/2011 | Niu |
| 2011/0027505 A1 | 2/2011 | Majumdar et al. |
| 2011/0033698 A1 | 2/2011 | Woods et al. |
| 2011/0033700 A1 | 2/2011 | Caylus |
| 2011/0045290 A1 | 2/2011 | Maeda et al. |
| 2011/0052843 A1 | 3/2011 | Dontula et al. |
| 2011/0064900 A1 | 3/2011 | Uesugi et al. |
| 2011/0064953 A1 | 3/2011 | O'Rourke et al. |
| 2011/0064956 A1 | 3/2011 | Casteren Van et al. |
| 2011/0077345 A1 | 3/2011 | Erdem et al. |
| 2011/0104488 A1 | 5/2011 | Mussig et al. |
| 2011/0111146 A1 | 5/2011 | Williams |
| 2011/0117296 A1 | 5/2011 | Jang et al. |
| 2011/0117299 A1 | 5/2011 | Kung et al. |
| 2011/0152439 A1 | 6/2011 | Wu et al. |
| 2011/0200830 A1 | 8/2011 | Tennebroek et al. |
| 2011/0250368 A1 | 10/2011 | Shih et al. |
| 2012/0000591 A1 | 1/2012 | Mussig et al. |
| 2012/0088054 A1 | 4/2012 | Shih et al. |
| 2014/0242316 A1 | 8/2014 | Shih et al. |
| 2015/0184037 A1 | 7/2015 | Owusu et al. |
| 2017/0203598 A1 | 7/2017 | Owusu et al. |

FOREIGN PATENT DOCUMENTS

| | | |
|---|---|---|
| CN | 1553853 | 12/2004 |
| CN | 100381530 | 4/2008 |
| CN | 101368073 | 2/2009 |
| CN | 100493670 | 4/2009 |
| CN | 100569884 | 12/2009 |
| CN | 101619200 | 1/2010 |
| CN | 100592110 | 2/2010 |
| CN | 101812277 | 8/2010 |
| CN | 101864258 | 10/2010 |
| CN | 101434819 | 11/2010 |
| CN | 101544725 | 12/2010 |
| CN | 101497680 | 2/2011 |
| CN | 102190988 | 9/2011 |
| CN | 102190990 | 9/2011 |
| CN | 102190992 | 9/2011 |
| CN | 102250566 | 11/2011 |
| CN | 102268233 | 12/2011 |
| CN | 101717468 | 1/2012 |
| CN | 101362815 | 2/2012 |
| CN | 102382605 | 3/2012 |
| CN | 101717612 | 5/2012 |
| CN | 101974299 | 7/2012 |
| CN | 102226068 | 7/2012 |
| CN | 102020956 | 9/2012 |
| CN | 102070741 | 1/2013 |
| CN | 102206476 | 3/2013 |
| CN | 102344522 | 7/2013 |
| CN | 101591511 | 8/2015 |
| DE | 4114085 | 11/1992 |
| DE | 102005029722 | 12/2006 |
| DE | 102005041134 | 3/2007 |
| DE | 102009005517 | 7/2010 |
| EP | 0275755 | 7/1988 |
| EP | 0355982 | 2/1990 |
| EP | 0538173 | 4/1993 |
| EP | 0547834 | 6/1993 |
| EP | 0696516 | 2/1996 |
| EP | 0899130 | 3/1999 |
| EP | 0929602 | 7/1999 |
| EP | 0976580 | 2/2000 |
| EP | 1026215 | 8/2000 |
| EP | 1114734 | 7/2001 |
| EP | 1125169 | 8/2001 |
| EP | 1180436 | 2/2002 |
| EP | 1260566 | 11/2002 |
| EP | 0997314 | 12/2002 |
| EP | 1135815 | 7/2003 |
| EP | 0963857 | 2/2004 |
| EP | 0933226 | 3/2004 |
| EP | 1520690 | 4/2005 |
| EP | 1059379 | 2/2006 |
| EP | 1705219 | 9/2006 |
| EP | 1364800 | 3/2007 |
| EP | 1767341 | 3/2007 |
| EP | 1777243 | 5/2011 |
| EP | 1908798 | 8/2013 |
| JP | 60-253544 | 12/1985 |
| JP | 4-285650 | 10/1992 |
| JP | 52-14181 | 8/1993 |
| JP | 7179831 | 7/1995 |
| JP | 08-99458 | 4/1996 |
| JP | 9-503168 | 3/1997 |
| JP | 10006654 | 1/1998 |
| JP | 10-110032 | 4/1998 |
| JP | 10235815 | 9/1998 |
| JP | 10-264500 | 10/1998 |
| JP | 10305533 | 11/1998 |
| JP | 10305534 | 11/1998 |
| JP | 11198555 | 7/1999 |
| JP | 11202536 | 7/1999 |
| JP | 11315257 | 11/1999 |
| JP | 2000-071607 | 3/2000 |
| JP | 2000168018 | 6/2000 |

(56) References Cited

FOREIGN PATENT DOCUMENTS

| | | |
|---|---|---|
| JP | 2000-185459 | 7/2000 |
| JP | 2000-309160 | 11/2000 |
| JP | 2000-326622 | 11/2000 |
| JP | 2000-336327 | 12/2000 |
| JP | 2001-071631 | 3/2001 |
| JP | 2002-322359 | 11/2002 |
| JP | 2003-002923 | 1/2003 |
| JP | 2003-096140 | 4/2003 |
| JP | 2003-154612 | 5/2003 |
| JP | 2003-154748 | 5/2003 |
| JP | 2003-220670 | 8/2003 |
| JP | 2003-231226 | 8/2003 |
| JP | 2003-276133 | 9/2003 |
| JP | 2004-010661 | 1/2004 |
| JP | 2004-010662 | 1/2004 |
| JP | 2004-083787 | 3/2004 |
| JP | 2004-090380 | 3/2004 |
| JP | 2004-223811 | 8/2004 |
| JP | 2004-331899 | 11/2004 |
| JP | 2005-070686 | 3/2005 |
| JP | 2005-131930 | 5/2005 |
| JP | 2005-132032 | 5/2005 |
| JP | 2005-238694 | 9/2005 |
| JP | 2006-021354 | 1/2006 |
| JP | 2006-052298 | 2/2006 |
| JP | 2006-088349 | 4/2006 |
| JP | 2006-150653 | 6/2006 |
| JP | 2006-274220 | 10/2006 |
| JP | 2006-346885 | 12/2006 |
| JP | 2007-037900 | 2/2007 |
| JP | 2007-038677 | 2/2007 |
| JP | 2007-050620 | 3/2007 |
| JP | 2007-111867 | 5/2007 |
| JP | 2007-118584 | 5/2007 |
| JP | 2007-160746 | 6/2007 |
| JP | 2007-237438 | 9/2007 |
| JP | 2007-296827 | 11/2007 |
| JP | 2007-297569 | 11/2007 |
| JP | 2008-012716 | 1/2008 |
| JP | 2008-062611 | 3/2008 |
| JP | 2008-073871 | 4/2008 |
| JP | 2008087173 | 4/2008 |
| JP | 2008-105356 | 5/2008 |
| JP | 2008-221689 | 9/2008 |
| JP | 2008-238481 | 10/2008 |
| JP | 2008-238481 A | 10/2008 |
| JP | 2009-120663 | 6/2009 |
| JP | 2009-172888 | 8/2009 |
| JP | 2010-069687 | 4/2010 |
| JP | 2010-076183 | 4/2010 |
| JP | 2010-094813 | 4/2010 |
| JP | 2010-094974 | 4/2010 |
| JP | 2010-229291 | 10/2010 |
| JP | 2010-253704 | 11/2010 |
| JP | 2010-253759 | 11/2010 |
| JP | 2010-253892 | 11/2010 |
| JP | 2010-269583 | 12/2010 |
| JP | 2011-021134 | 2/2011 |
| JP | 2011-032355 | 2/2011 |
| JP | 2011-051303 | 3/2011 |
| WO | 92/14768 | 9/1992 |
| WO | 95/04655 | 2/1995 |
| WO | 98/04418 | 2/1998 |
| WO | 99/28791 | 6/1999 |
| WO | 00/13887 | 3/2000 |
| WO | 00/13888 | 5/2001 |
| WO | 02/31016 | 4/2002 |
| WO | 02/36353 | 5/2002 |
| WO | 02/48260 | 6/2002 |
| WO | 02/062894 | 8/2002 |
| WO | 03/016045 | 2/2003 |
| WO | 03/037614 | 5/2003 |
| WO | 03/080356 | 10/2003 |
| WO | 2003/093357 | 11/2003 |
| WO | 2004/003060 | 1/2004 |
| WO | 2004/003093 | 1/2004 |
| WO | 2004/060641 | 7/2004 |
| WO | 2004/060686 | 7/2004 |
| WO | 2005/068195 | 7/2005 |
| WO | 2010/005452 | 1/2010 |
| WO | 2010/062438 | 6/2010 |
| WO | 2010/091346 | 8/2010 |
| WO | 2010/129299 | 11/2010 |
| WO | 2011/037732 | 3/2011 |
| WO | 2011/109692 | 9/2011 |
| WO | 2011/146188 | 11/2011 |
| WO | 2011/091132 | 12/2011 |
| WO | 2013/033067 | 3/2013 |

OTHER PUBLICATIONS

International Preliminary Report on Patentability dated Nov. 4, 2012 issued in corresponding International Application No. PCT/US2011/027154 filed Mar. 4, 2011.
"Evaluation of the Residual Stability of Polyurethane Automotive Coatings by DSC," P. Simon et al., Journal of Thermal Analysis an Calorimety, vol. 84 (2006) 3, 679-692.
Derwent Abstract for JP H10-110032 dated Apr. 28, 1998.
International Search Report and Written Opinion dated Oct. 24, 2012 issued in corresponding International Application No. PCT/US2012/052616.
International Preliminary Report on Patentability dated Mar. 13, 2014 issued in corresponding International Application No. PCT/US2012/052616.
Invitation to Pay Additional Fees and Partial International Search Report issued in PCT/US08/069706 dated Oct. 30, 2008.
SAE Technical Standard J1960 (Rev. Oct. 2004).
Griffin, G.J.L, "Biodegradation of ethylene/vinylacetate copolymers," Proceedings of 3rd International Biodegredation Symposium, pp. 807-813, 1975.
International Search Report and the Written Opinion of the International Searching Authority issued in PCT/US08/069706 dated Feb. 19, 2009.
Invitation to Pay Additional Fees and Partial International Search Report issued in PCT/US2008/084812 dated Mar. 20, 2009.
International Search Report and Written Opinion issued in corresponding PCT/US2008/084812 dated May 19, 2009.
International Search Report dated Apr. 16, 2015 issued in corresponding International Application No. PCT/US2014/070259.
Written Opinion dated Apr. 16, 2015 issued in corresponding International Application No. PCT/US2014/070259.
International Preliminary Report on Patentability dated Jul. 14, 2016 issued in corresponding International Application No. PCT/US2014/070259.
International Search Report and Written Opinion dated Apr. 17, 2013 issued in corresponding International Application No. PCT/US2013/021205 filed Jan. 11, 2013.
International Preliminary Report on Patentability dated Jul. 24, 2014 issued in corresponding International Application No. PCT/US2013/021205 filed Jan. 11, 2013.
Griffin, G.J.L, "Biodegradation of ethyleneivinylacetate copolymers," Proceedings of 3rd International Biodegradation Symposium, pp. 807-813, 1975.
Australia: Exam Report dated Oct. 21, 2016; Application No. 2015221506; 12 pages.
Press release "Air Products Introduces Hybrid Waterborne Resins at ICE," published on Nov. 14, 2003, downloaded from https://coatings.specialchem.com.
Notice of Opposition filed by Eun-Suk Choi in corresponding EP2542409, dated Sep. 24, 2019, 29 pages.

* cited by examiner

NON-PVC FILM AND NON-PVC FILM LAMINATE

CROSS REFERENCE TO RELATED APPLICATIONS

The present application is a continuation of U.S. application Ser. No. 13/040,642 filed Mar. 4, 2011, which claims priority from U.S. Provisional Application No. 61/310,378 filed Mar. 4, 2010, both of which are incorporated herein by reference in their entireties.

FIELD OF THE INVENTION

The present invention is in the field of non-PVC films and non-PVC film laminates for use with small format, and large format graphic films and presentations, advertising media, promotional media, static visual communications, vehicle and product wraps and other commercial applications. The film may be clear, transparent, translucent or have other desirable optical properties.

BACKGROUND OF THE INVENTION

Polyvinyl chloride (PVC) films have been used widely in a number of promotional and advertising campaigns, such as outdoor graphics applications in the past. Such applications include signs, banners, fleet marketing graphics, architectural and wall covering, consumer product labeling and other pressure sensitive products. However, there is an increasing awareness on the environmental and health impacts and effects of using PVC based products, which has increased significantly in recent years. Currently, there is a movement to reduce or even eliminate PVC-based products from the consumer marketing, promotional and advertising product streams.

Films for outdoor marketing and graphics applications ideally should have at least some of the following properties: printability, durability, color retention, and scratch resistance. Conformability and proper mechanical properties such as tensile elongation and tensile strength are also preferable for the application process. A non-conformable film, i.e. a film which does not have sufficient elongation or flexibility may not follow the contour of the subject or surface to which it is applied, creating bubbles or gaps between the surface and the film. Insufficient elongation properties may make the film hard to apply over a surface, e.g. those surfaces that have curves, angles, ridges and other non-planar configurations, but too much elongation may deform the film and potentially causing a distortion of the printed indicia. Films with a low tensile strength may cause the film to break easily when being stretched such as when the film is being applied to a non-planar surface.

As new PVC replacement films are being developed, some of the films have superior performance in one area, such as printability, but lack adequate functionality with respect to the other properties such as the outdoor durability to make the films acceptable for the demanding advertising and promotional market. One possible way to resolve the foregoing problem is to use a multi-layer film laminate with each layer providing one or more of the desired properties so that the laminate has all the desired properties that are needed.

When used as the outermost protective layer in a film laminate, or simply used as a protective film for a given surface, good outdoor durability and in many cases optical transparency is also required so the indicia on an underneath printable layer can be visible.

Therefore, there is a need for non-PVC-based transparent films and non-PVC film laminates for use with outdoor graphics and other marketing and consumer use applications.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The invention is directed to a non-PVC based film product having similar properties to those of conventional PVC offerings that is suitable for use in connection with marketing promotions, graphics, branding campaigns and other printed or imaged communication based initiatives.

In one exemplary embodiment of the presently described invention, a non-PVC film, which may be clear, transparent, translucent or have other desirable optical properties, is made of polyurethane, polyurethane-acrylic copolymer, polyurethane-acrylic blend, or urethane-acrylic hybrid polymer.

In another exemplary embodiment of the presently described invention, a non-PVC transparent film includes a top layer and a bottom layer. The top layer includes a polyurethane, polyurethane-acrylic copolymer, polyurethane-acrylic blend, or urethane-acrylic hybrid polymer. The bottom layer includes an emulsion based, solvent-based, or extruded non-PVC based polymer.

In another exemplary embodiment of the presently described invention, a non-PVC film laminate is provided that includes a top layer, a bottom layer, an adhesive layer and a substrate. The top layer includes a urethane-acrylic hybrid polymer. The bottom layer has a non-PVC emulsion based polymer. The substrate layer bears printed or imaged indicia or graphics.

In a further exemplary embodiment of the presently described invention, an advertising graphic is presented and includes a surface having promotional indicia provided thereon, a transparent film having front and back faces, with the back face in contact with the surface and the front face exposed to an atmosphere (e.g. air) or non-atmosphere (e.g. ice). The film includes a first layer and a second layer substantially beneath the first layer, and an adhesive layer beneath the second layer opposite the first layer. The first layer of the film includes a urethane-acrylic hybrid polymer and the second layer includes non-PVC emulsion based polymer.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

Unless otherwise indicated, the illustrations in the above figures are not necessarily drawn to scale.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to FIGURES.

The present invention relates to a film and a film laminate used for outdoor graphics applications, advertising, promotions and other marketing campaigns. More particularly, the present invention relates to a non-PVC transparent film and non-PVC film laminate for use in such applications. The film and film laminate provide suitable outdoor durability, scratch resistance, gloss, conformability, tensile elongation and tensile strength.

In one exemplary embodiment of the invention, a single layer transparent film with properties suitable for use in the outdoor graphics applications is made of polyurethane, polyurethane-acrylic copolymer, polyurethane-acrylic blend or polyurethane-acrylic hybrid polymer.

In another exemplary embodiment of the invention, a multi-layer transparent film provides properties suitable for use in the outdoor graphics applications. The multi-layer film has at least two layers. The first layer is made of polyurethane, polyurethane-acrylic copolymer, polyurethane-acrylic blend or urethane-acrylic hybrid polymer. The thickness of this first layer can be from about 0.3 mil (7.6 microns) to about 2 mils (50.8 microns). The other layers provide additional mechanical strength, improved adhesion, improved conformability and reduced cost to the overall construction. The number of layers can be determined based on the final requirement on the product, the cost restriction and availability of processing equipments. Such other layers can be made from emulsion polymers, solvent polymers or extruded polymers. Suitable polymers include, without limitation, acrylic polymers, styrene acrylic polymers, vinyl acetate ethylene copolymers, and polyolefins. The thickness of such other layer can vary from about 0 mil to about 2 mils. Examples of emulsion polymers include, without limitation, JONCRYL 617A JONCRYL 1987, JONCRYL 98, JONCRYL FLX5000, ACRONAL NX4612X and ACRONAL OPTIVE 410 available from BASF, Ludwigshafen, Germany; and VINNAPAS EF 811 from Wacker Chemicals, Munich, Germany or combinations thereof.

In yet another exemplary embodiment of the invention, a non-PVC transparent film includes a top layer and a bottom layer. The top layer is made of polyurethane, polyurethane-acrylic copolymer, polyurethane-acrylic blend or polyurethane-acrylic hybrid polymer. The bottom layer includes a non-PVC emulsion based polymer. Generally, the non-PVC based polymer can be an emulsion based polymer, a solvent based polymer, and/or an extruded polymer. In certain embodiments, the non-PVC based polymer is an acrylic polymer.

As used herein the term "graphic" or "graphics" refers to a visually perceptible presentation on some surface that is intended to brand, illustrate, entertain, inform, advertise, announce and market a product, service, event or the like.

Figure 1:
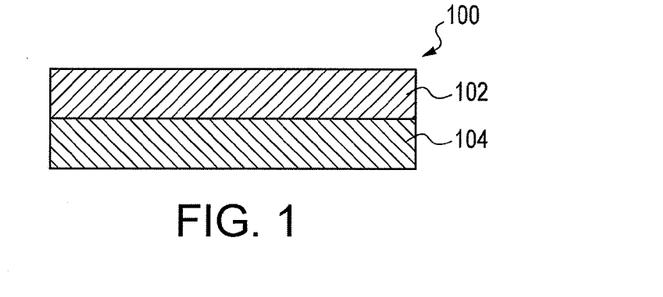
FIG. 1 is a sectional illustration of one exemplary embodiment of a film according to the present invention.

Reference is now directed to the FIGURES in which FIG. 1 provides a sectional view of an exemplary film prepared in accordance with the presently described invention. The film 100 has two layers. The film may be transparent, translucent, clear or have other desirable optical properties. The top layer 102 is, in one exemplary embodiment, a urethane-acrylic hybrid polymer. Bottom layer 104 is in the presently described embodiment a strengthening polymer layer.

In addition, the film layers may have at least one additive added to either one or both, or two additives added to one or both of the layers. If an intermediate layer is included (see FIG. 4) the additive may also be present in the intermediate layer. The additives are selected from a group including UV stabilizing agents, free-radical scavengers, cross-linking agents, thickeners, flow and leveling agents, rheology modifiers, surfactants, defoamers, dispersants, wetting agents, dyes, pigments, co-solvents or combinations thereof.

The urethane-acrylic hybrid polymer of the top layer 102 is a combination of urethane polymer and acrylic polymer mixed at the molecular level. In order to be environmentally friendly, the top layer 102 is preferred to be created from waterborne dispersions, although other methods for producing the urethane-acrylic hybrid polymer may also be used. Typically, there are two methods to make such hybrid polymer dispersions. In a first method, a polyurethane dispersion is prepared. Acrylic monomers are then added to the polyurethane dispersion. The acrylic polymer is formed in the presence of the polyurethane dispersion. In a second method, a polyurethane prepolymer is formed. The acrylic monomers are then added to the prepolymer. The urethane and acrylic polymerizations are completed concurrently. There are numerous publications on these methods. For example, U.S. Pat. No. 3,684,758 to Honig; 4,198,330 to Kaizerman; 4,644,030 to Loewrigkeit; and 5,594,065 to Tien describe the foregoing methods in detail. Publications, patents and patent applications are referred to throughout this disclosure. All references cited herein are hereby incorporated by reference.

The urethane-acrylic hybrid polymer dispersions prepared according to the above described methods have been found to show better mechanical properties when compared to a simple blend of the two polymers due to the molecular level mixing which occurs through use of the foregoing processes. In order to make the formulation even more environmentally friendly, that is to reduce the environmental impact over other preparations, the urethane-acrylic hybrid polymer dispersions can be further improved to be free of N-methylpyrrolidone (NMP), a component typically used as a processing solvent in other applications.

Suitable urethane-acrylic hybrid polymer dispersions for use in the compositions of the present invention are those with aliphatic acrylic monomers and aliphatic polyurethane components. As the film products produced will be used in an outdoor environment, the films will be exposed to moisture, such as dew, rain or snow; temperature deviations; light and other conditions which may impact the film performance. For example, moisture may cause components of the film or images thereon to bleach out or fade, and the film itself to whiten. Therefore, maintaining a proper balance of hydrophilic monomers and other components is required in order for this film to achieve the required resistance when exposed to such conditions. The monomers and other components should also be selected so as to be balanced to achieve the required tensile properties, block resistance, scratch resistance, transparency, and gloss. For example, the amount of acrylic present in the urethane-acrylic hybrid polymer controls the tensile properties of this top layer.

Suitable urethane-acrylic hybrid dispersions for use in the present invention are available under the trade name HYBRIDUR from Air Products, Allentown, Pa., including HYBRIDUR 870; HYBRIDUR 570; HYBRIDUR 580; HYBRIDUR 878; and NEOPAC R9000 from DSM Neo-Resins, of Waalwijk, The Netherlands.

UV blocking agents and free radical scavengers can be added to the top layer to improve the outdoor durability. UV blocking agents suitable for this application are typically benzotrizole based compounds, or other compounds capable of absorbing UV energy in the required region. Commercially available UV absorbing agents include, without limitation, TINUVIN 400 DW, TINUVIN 292 from BASF, Ludwigshafen, Germany; and HOSTAVIN 3310 from Clariant; Muttenz, Switzerland. The amount of UV blocking agent can range from about 0% to about 5%.

Free radical scavengers may also be added to the top layer of the film to improve the weather durability of the top layer. Suitable free radical scavengers include but are not limited to TINUVIN 1130, TINUVIN 123 DW from BASF, Ludwigshafen, Germany; and HOSTAVIN 3065 from Clariant, Muttenz, Switzerland. The amount of free radical scavengers can range from about 0% to about 5%.

Other UV blocking systems can also be used for improving weathering durability of this film. These include nano sized zinc oxide and cerium oxide or combinations thereof which may be used to achieve the UV resistance required for the film. Suitable nano metal oxides include but are not limited to NANOBYK 3840, NANOBYK 3810 from BYK Additives, of Altana, Wesel, Germany. The total amount of additives may range from about 0% to about 10%.

Continuing with a discussion of the laminate provided in FIG. 1, the bottom layer 104 has a polymer layer that improves tensile properties of the overall film 100 which may also reduce the cost of the overall film. Examples of such strengthening polymer layer include, without limitation, emulsion based polymers, solvent based polymers, and extruded polymers. Suitable polymers include, without limitation, acrylic polymers, styrene acrylic polymers, vinyl acetate ethylene copolymers, and polyolefins. UV stabilizers and free radical scavengers can also be added to the bottom layer. The additives together can range from about 0% to about 5% of the total formulation.

When acrylic polymers are used in the bottom layer 104, the acrylic polymers can be the same or different from those used in the top layer 102. Both aliphatic and aromatic acrylics can be suitable for inclusion in the bottom layer. Suitable acrylic polymers include acrylic emulsions that have superior block resistance, tensile properties and clarity, such as JONCRYL 617A available from BASF, Ludwigshafen, Germany.

The thickness of the top layer 102 can range from about 0.5 mil to about 5 mils. The thickness of the bottom layer 104 can range from about 0.5 mil (12.7 microns) to about 5 mils (127 microns). When the thickness of the top layer 102 is too thin, the chemical resistance, scratch resistance and outdoor durability of the film may suffer. When the thickness of the bottom layer 104 is too thin, the tensile properties of the whole film may not be sufficient. Contrary to the above, when the top and bottom layers 102, 104 respectively, are too thick, the thickness of the construction may also impact the conformability of the film.

The film 100 can be generated using any process suitable for such purpose. In one embodiment, the film compositions were first deposited onto a removable support or carrier layer by techniques well known to those skilled in the art. Examples of such techniques include die coating, knife coating, curtain coating and reverse roll coating. The removable support can be separated after the compositions have been dried. An exemplary removable support can be selected from a group including a siliconized belt, a release paper, and a release film such as PET or other suitable materials.

Figure 2:
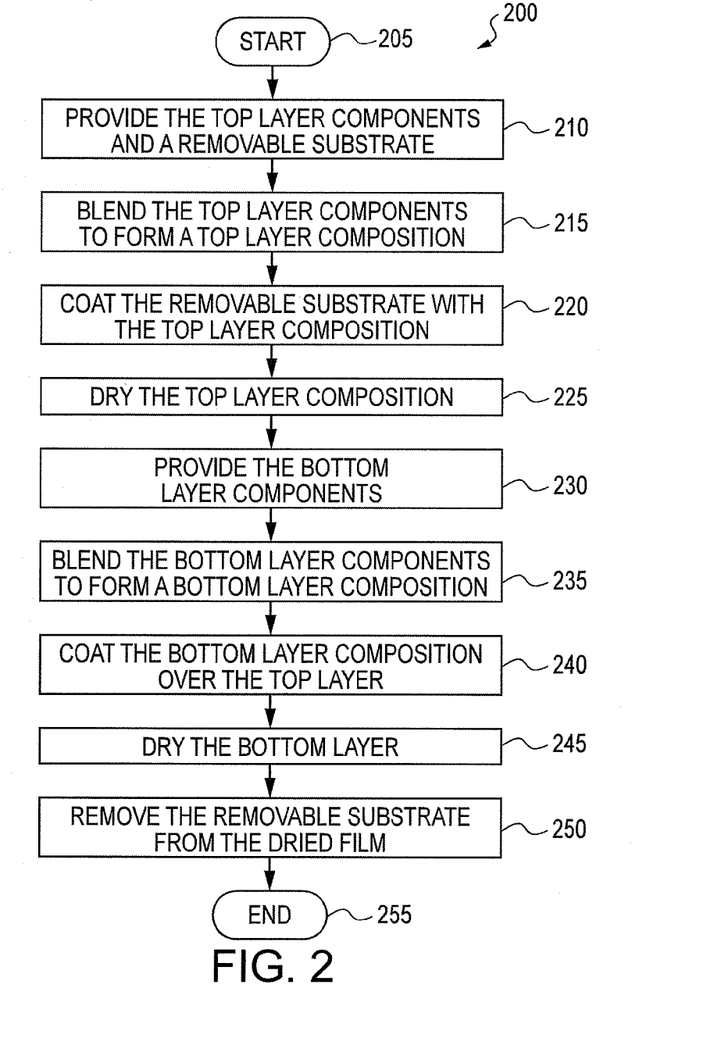
FIG. 2 is a block diagram illustrating an exemplary manufacturing process for making one embodiment of the film according to the present invention.

An exemplary method of making a film according to the present invention is illustrated in the block diagram 200 of FIG. 2. After starting the process at step 205, the next step 210 is to provide the top layer components and a removable support. Next, at step 215, the top layer components are blended to form a top layer composition. The top layer composition includes polyurethane, polyurethane-acrylic copolymer, polyurethane-acrylic blend, or urethane-acrylic hybrid dispersions and at least one of free radical scavenger and UV blocking agent. Next, at step 220, the removable support is coated with the top layer composition, such as by slot die coating, curtain coating or other acceptable methods. At step 225, the top layer composition is dried. Drying may occur by using a heated or ambient air environment, curing or by other suitable methods. At step 230, the bottom layer components are provided. At step 235, the bottom layer components are blended to form a bottom layer composition. The bottom layer composition includes emulsion polymer or solvent polymer and at least one of a free radical scavenger and a UV blocking agent. The bottom layer composition is coated over the top layer at step 240, such as by slot die coating. At step 245, the bottom layer composition is dried. Alternatively, the film is further laminated with a pressure sensitive adhesive (PSA) coated release liner before proceeding to the next step. At step 250, the removable support is removed or separated from the dried two layer film. The separation or removal can be accomplished by using a peel blade or knife which serves to separate the film from the carrier or support layer. Alternatively, the film can be separated by the carrier at a sharp angle so that the film can be easily picked up from the carrier or support. The film is rolled up and ready for use. Alternatively, the film can be cut and separated into sheets or sections of equivalent sizes or of varying lengths. The method ends at step 255.

The top layer and the bottom layer are substantially coextensive with one another, that is the edges and/or sides are aligned and in juxtaposition. It is of course possible, that the top layer could be applied in a pattern over the bottom layer so that the layers are not completely juxtaposed on one another.

Figure 3:
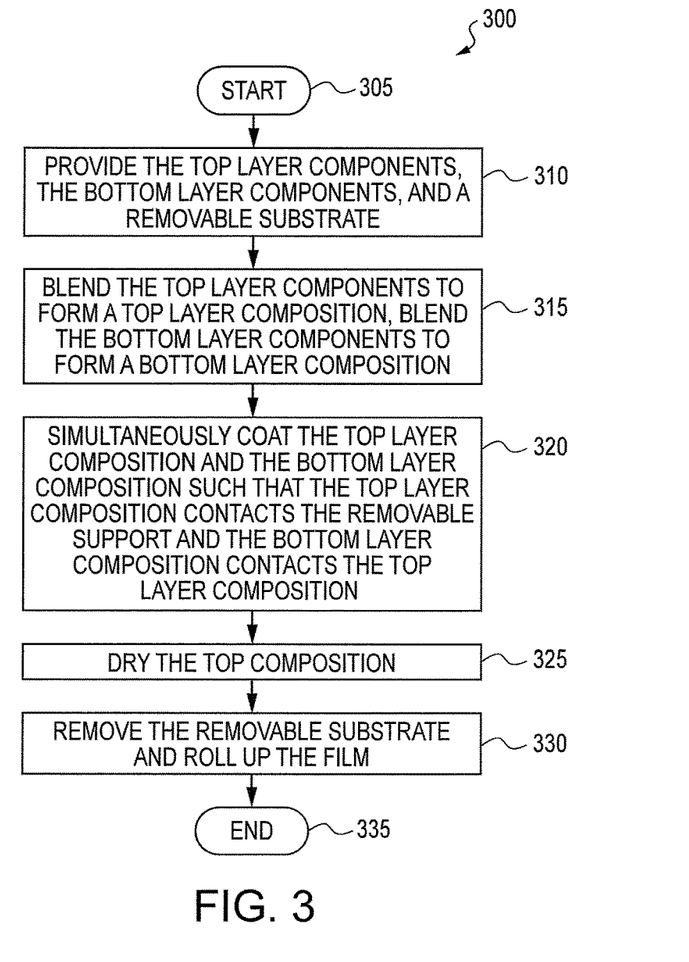
FIG. 3 is a flow chart illustrating another manufacturing process for making one embodiment of the film according to the present invention.

In another embodiment of the invention, the compositions of the top layer and the bottom layer can be coated onto a removable support simultaneously. Flowchart 300 in FIG. 3 illustrates such an exemplary process. After starting at step 305, the next step 310 is to provide the top layer components, the bottom layer components and a removable support. Next, at step 315, the top layer components are blended to form a top layer composition. Substantially, simultaneously, the bottom layer components are blended to form a bottom layer composition. Next, at step 320, the top layer composition and the bottom layer composition are coated simultaneously using a dual die with the top layer composition contacting the removable support and the bottom layer composition contacting the top layer composition. Additionally, the top layer and bottom layer can be formed separately and then extruded or coated on to the support or carrier through a common apparatus. At step 325, the coated compositions are dried. Alternatively, the film is further laminated with a PSA coated release liner before proceeding to the next step. After drying of the compositions, the removable support or carrier layer can be removed from the dried two layer film in step 330. The film can be rolled up and ready for use or sheeted depending on the requirements of the particular application. The film may then be printed or imaged by conventional methods such as by ink jet and electrostatic printing technologies or alternatively, the film can be applied over another substrate which may have been printed or imaged previously. The method ends at step 335.

In addition to the foregoing, the film can be further overcoated with a varnish or other material to provide a glossy appearance. This step may occur during the film forming process, after printing or after collection of the material after the production process has been completed.

The film of the present invention can be used in operative association with a graphic or other message. As used herein, operative association includes applying the film over the graphic or message, including the graphic or message as part of the film either as an additional layer, such as a printing layer or previously printed layer, or applying a graphic or message over the film.

The film can be used as a printable media for outdoor applications, architectural and transportation type advertising campaigns and the like. The film can also be used as a protective film to be laminated over a subject, such as a protective laminate for electronic appliances, architectural, artistic or aesthetic elements, a retro-reflective license plate, a retro-reflective signage film, a name plate, a label, automotive exterior and interior parts, and the like. Additional exemplary uses may include safety signs, a graphic display, governmental mandated displays, military applications or a surface that needs protection in the outdoor environment.

The film can also include an adhesive layer. The adhesive can be a pressure sensitive adhesive, glue, and any other type of adhesives that are optically transparent, and when used to contact the printed indicia, would not affect the printed indicia. The adhesive may be pattern coated, and may be selected for particular properties such as permanent, removable or repositionable and the like. The adhesive can be random copolymer adhesives or block copolymer adhesives. Random copolymer adhesives include those based upon acrylic and/or methacrylic copolymers, α-olefin copolymers, silicone copolymers, chloroprene/acrylonitrile copolymers, and the like. Block copolymer adhesives including those based upon linear block copolymers (i.e., A-B and A-B-A type), branched block copolymers, star block copolymers, grafted or radial block copolymers, and the like, and natural and synthetic rubber adhesives. A description of useful pressure sensitive adhesives can be found in Encyclopedia of Polymer Science and Engineering, Vol. 13. Wiley-Interscience Publishers (New York, 1988). Additional descriptions of useful pressure sensitive adhesives can be found in Encyclopedia of Polymer Science and Technology, Vol. 1, Interscience Publishers (New York, 1964).

When pressure sensitive adhesives are used, a release liner can be used to protect the adhesive from inadvertent contact with unintended surfaces. Any release liner suitable for the chosen adhesive can be used. For pressure sensitive adhesives, release liners can be coated papers or films, and super calendared paper, for example. Coating materials suitable for release liners include, for example, silicone-based and fluorine-based materials, or any other material that has the desired releasing properties, for example, waxes and carbamates.

Figure 4:
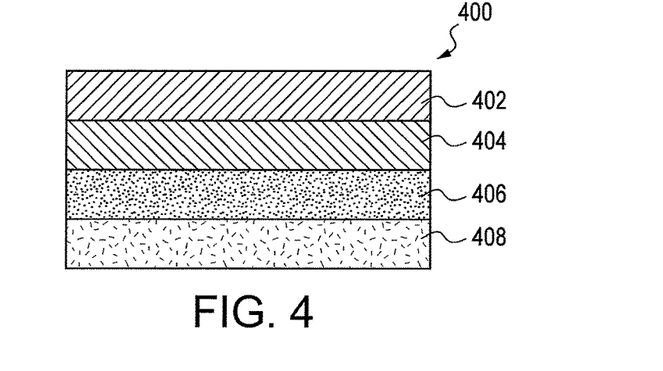
FIG. 4 is a sectional illustration of one exemplary embodiment of a film according to the present invention.

FIG. 4 illustrates one embodiment of the current invention. The film 400 has a top layer 402, a bottom layer 404, an intermediate layer 406 and a release liner 408. Upon application, the release liner can be peeled off to expose the adhesive surface. The film can be attached to the surface to be protected through the adhesive layer. The intermediate layer may include an adhesive layer, a tie coating layer or an adhesion promoting layer.

Figure 5:
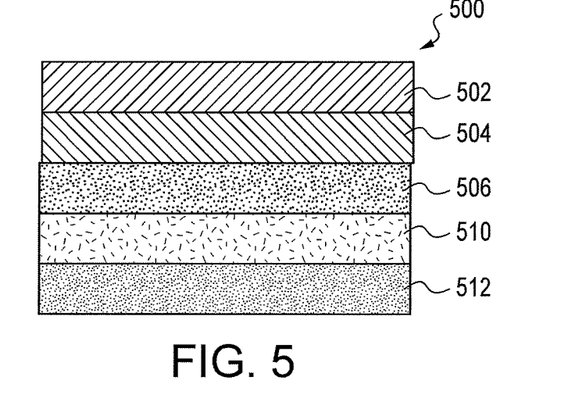
FIG. 5 is a sectional illustration of a further exemplary embodiment of a film laminate according to the present invention.

The film can also be used as part of a larger film laminate. FIG. 5 illustrates a cross-sectional view of one embodiment of a film laminate. The film laminate 500 is comprised of a top layer 502, a bottom layer 504, an adhesive layer 506, an ink layer 510, and an underlying substrate layer 512. Though referred to as an ink layer, the ink may not necessarily form a continuous layer. Various printable materials can be used as the underlying substrate layer. A non-PVC based printable material is preferred to make the whole film laminate non-PVC based. International patent application PCT/US08/84812 describes various films created using non-PVC compositions and is incorporated herein by reference in its entirety. Ink or toner anchor coatings, such as polyvinyl alcohol can be added to increase the anchorage of the printing to the laminate.

Figure 6:
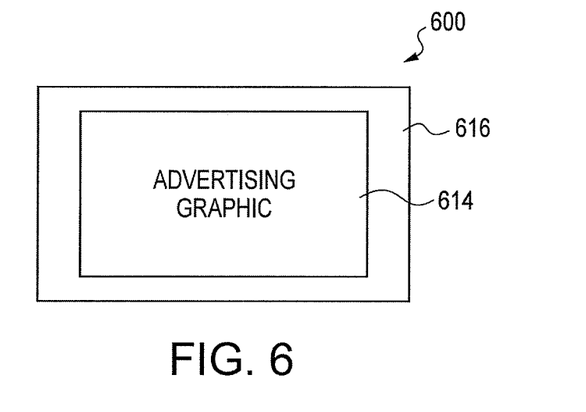
FIG. 6 illustrates the top view of an exemplary embodiment of an advertising graphic applied on a surface according to the present invention.

FIG. 6 illustrates a top view of an exemplary embodiment of an advertising graphic film applied to a surface according to the present invention. The film laminate 600 bearing advertising graphic 614 is posted on a surface 616 through the use of an adhesive.

Figure 7:
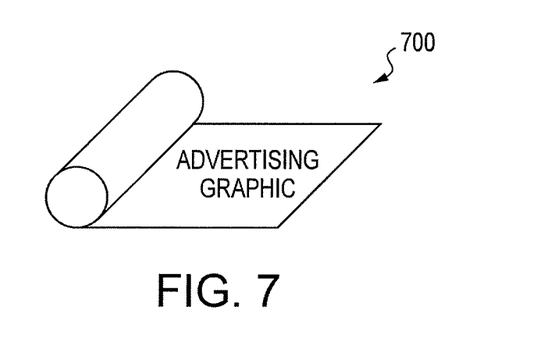
FIG. 7 illustrates an exemplary embodiment of a roll of an advertising graphic according to the present invention.

FIG. 7 illustrates an exemplary embodiment of a roll of the film laminate 700 according to the present invention.

Additional components, such as thickeners, flow and leveling agents, and rheology modifiers can be added to each of the top and bottom formulations to achieve desired coating quality. Examples of suitable thickeners include, without limitation, ACRYSOL RM-2020 NPR, TM8W, and UCAR POLYPHOBE 115 TR from Dow Chemicals, Midland, Mich. Examples of suitable flow and leveling agents include without limitation, ZONYL FS300 from Dupont; Polyfox PF-156A from Omnova Solutions; and Masurf from Mason Chemical Company and others with similar chemistry. The percent incorporation can vary from 0% to 10% in both layers. Additional viscosity modifiers can be included in the formulation to modify the viscosity to a desired level and/or to impart desirable flow characteristics. These can be urethane based alkali swellable associative thickeners. Products like UCAR polyphobe 102 from Arkema Emulsion Systems or Rheolate 350 from Elementis are typical examples that can be used in the formulations. The percent incorporation can vary from between 0% to 10% in both layers. Other components, such as water or isopropyl alcohol (IPA) can also be added to the formulation at about 0% to about 10%.

Cross-linking agents can be added to the top layer formulations to improve the mechanical properties of that film layer. Examples of suitable cross-linking agents include, without limitation, polyaziridine based CX-100 from DSM Neo Resins, Waalwijk, The Netherlands; UCARLINK XL-255E, ERL-4221, ERL-4234 from Dow Chemicals, Midland, Mich.; and COATOSIL 1770, SILQUEST A-187 from Momentive Performance Materials Inc., Waterford, N.Y.

Without limitation, other additives, for example, surfactants, defoamers, dispersants, wetting agents, dyes, pigments and co-solvents known to those skilled in the art can be added to the composition of each of the top layer and bottom layer.

Test Methods

Thickness

Film thickness is measured using TMI Model 49-70 Precision Micrometer available from Testing Machines Inc. in Ronkonkoma, N.Y. The specimen is placed between an upper and a lower anvil. The upper anvil rests on top of the specimen and the thickness is measured and displayed on the digital readout.

CIE L*a*b* Color Space

This test is used to describe the color of a sample. This 3-dimensional color space system was developed by the International Commission on Illumination (CIE), and defines L* as representing the lightness of the color, ranging from 0 (black) to 100 (white). In this system, a* represents the color's position along the red (magenta)/green axis, in which negative values represent green and positive values represent red or magenta, and b* represents the color's position along the blue/yellow axis, in which negative values represent blue and positive values represent yellow. The test is conducted using a COLOR 15 Benchtop Spectrophotometer available from X-Rite, Inc., Grand Rapids, Mich. The test method is TAPPI T524 om-94.

Accelerated Weathering

Accelerated weathering test simulates the damaging effects of long term outdoor exposure of materials by exposing test samples to light, moisture and temperature extremes. Sample is tested and observed for light fastness (fading of colors), and weatherability (cracking, chalking, curling, shrinkage, etc . . . ). An Atlas C165A Xenon Arc Weather-Ometer from Atlas Material Testing Technology LLC in Chicago, Ill. is used for this test.

A printing pattern with white, yellow, magenta, cyan and black stripes is first printed on a printable substrate. The film of the current invention, which may be transparent, translucent, clear or have other desirable optical properties, is then laminated over the print layer to make a film laminate through the use of a pressure sensitive adhesive. The sample is first tested for CIE L*a*b* Color Space before placed in the Weather-Ometer. The sample is allowed to age in the Weather-Ometer for a designated amount of time. The sample is taken out of the Weather-Ometer for CIE L*a*b* Color Space reading and observation for any changes in shrinkage, chalking, cracking etc . . . . If there is no visible change after 2000 hours, and the changes in L*, a* and b* together, represented by ΔE, is less than 10, the sample is given a pass grade. ΔE value is calculated using the following formula:

$$\Delta E = \sqrt{(\Delta L^2 + \Delta a^2 + \Delta b^2)}.$$

Gloss

Gloss is measured using a BYK Gardner Micro-TRI-Gloss Gloss Meter from BYK Gardner USA in Columbia, Md. The universal measurement angle 60° is used for the measurement. Typically the acceptable gloss reading is 80 or higher.

Tensile Strength and Tensile Elongation

The tensile elongation and tensile strength of the film is tested using Instron Model 5542 from Instron Co. in Canton, Mass. A modified ASTM D882 was used to determine the tensile strength and percentage elongation of the films of the present invention. The procedure is as follows:

1. A 1 inch×4 inch (25.4 mm×101.6 mm) specimen was cut out in the machine direction.
2. Grip the film 1 inch (25.4 mm) from the end at both the ends, so the separation between the grips is 2 inches (50.8 mm).
3. Set the crosshead speed at 12 inches per minute ("ipm") (304.8 mm per minute).
4. Obtain the tensile strength, which is the product of tensile stress times, the thickness of the film. The tensile strength at break is the maximum stress that occurs at break times the thickness of the film.
5. The % elongation is reported by the machine.

The standard requires a minimum ultimate elongation of 180% and a minimum tensile strength of 0.5 pound per square inch ("psi") (6,895 N/m$^2$). The presence or absence of pressure sensitive adhesive (PSA) on the film does not appreciably alter the strength and/or elongation of the film. As such, wherever the film in the examples below includes PSA, the tensile elongation test was performed using the same film but without the layer of PSA.

Rivet Testing

Test samples approximately 2.5 inch (63.5 mm)×2.5 inch (63.5 mm) are applied over painted 4 inch (101.6 mm)×12 inch (304.8 mm) aluminum panels from Frontier Tank Center in Richfield, Ohio. Brazier rivet heads which are 11.4 mm (diameter)×3.3 mm (height)×7.62 mm (shaft diameter) (0.45" (diameter)×0.13" (height)×0.3" (shaft diameter)) are uniformly distributed over the aluminum panel. Application is done so as to minimize forming any wrinkles especially around these rivet heads. Entrapped air is released with the use of pin pricks while a brush with hard bristles and plastic squeegee is used to get the best conformation of the film around the rivet. The sample is dwelled for 24 hours at ambient condition. The diameter of the lifted portion of the film around the rivet is measured and recorded. The sample is then placed in Atlas Ci5000 Xenon Arc Weather-Ometer from Atlas Electric Devices Co. in Chicago, Ill., using a UVB 313 bulb for 1000 hours. The sample is then taken out and the diameter of the film lifted around the rivets is measured again. When the change in diameter is less than 0.0625 inch (1.58 mm), the sample is given a pass grade.

Shrinkage Test

Test sample is coated with a pressure sensitive adhesive under the trade name S8072 from Avery Dennison Corporation in Pasadena, Calif. at about 30 gram per square meter (gsm) coat weight. The sample is then attached to a clean aluminum panel from O-Lab Corporation of Cleveland, Ohio. The sample is dwelled at ambient condition for 24 hours. A 5 inch (127 mm) cross hatch in both machine direction (MD) and cross-machine direction (CD) are made on the film. The sample is then aged at 160° F. (71° C.) for 48 hours. The dimension change in the MD and CD are measured. If the shrinkage is less than 0.33% in both directions, the sample is given a pass grade.

EXAMPLES

The chemicals used in the following examples are listed in Table 1 with information on the function, manufacture and location of each.

TABLE 1

| Name of the Chemical | Function | Manufacturing Company | Location |
| --- | --- | --- | --- |
| HYBRIDUR 870 | Top layer component | Air Products | Allentown, Pennsylvania |
| JONCRYL 617 A | Bottom layer component | BASF | Ludwigshafen, Germany |
| TINUVIN 123 DW | Free radical scavenger | BASF | Ludwigshafen, Germany |
| TINUVIN 400 DW | UV blocking agent | BASF | Ludwigshafen, Germany |
| TINUVIN 292 | UV blocking agent | BASF | Ludwigshafen, Germany |
| TINUVIN 1130 | Free radical scavenger | BASF | Ludwigshafen, Germany |
| TEXANOL ESTER SOLVENT | Solvent | Eastman Chemical | Kingsport, Tennessee |
| DOWANOL DPNB | Solvent | Dow Chemicals | Midland, Michigan |
| VINNAPS EF 811 | Component for additional layers | Wacker Chemicals | Munich, Germany |
| ZONYL FS300 | Flow and leveling agent | Dupont | Wilmington, DE |
| UCAR POLYPHOBE 102 | Viscosity modifier | Arkema Emulsion Systems | Cary, NC |
| ARCRONAL NX4612X | Bottom layer component | BASF | Ludwigshafen, Germany |
| JONCRYL 1987 | Bottom layer component | BASF | Ludwigshafen, Germany |

Table 2 lists five examples of formulations used to create the top layer.

TABLE 2

| Example No. | HYBRIDUR H 870 % | TINUVIN 123 DW % | TINUVIN 400 DW % | TEXANOL % | DpNB % | Total % |
| --- | --- | --- | --- | --- | --- | --- |
| 1 | 95.25 | 1.90 | 2.85 | 0.00 | 0.00 | 100.00 |
| 2 | 96.78 | 1.27 | 1.95 | 0.00 | 0.00 | 100.00 |
| 3 | 93.45 | 1.87 | 2.80 | 0.94 | 0.94 | 100.00 |
| 4 | 92.60 | 1.85 | 2.77 | 1.39 | 1.39 | 100.00 |
| 5 | 94.95 | 1.25 | 1.90 | 0.95 | 0.95 | 100.00 |

Examples 1 to 5

Top Layer Compositions

Table 3 lists two examples of formulations used to create the bottom layer.

Examples 6 to 7

Bottom Layer Compositions

TABLE 3

| Example No. | JONCRYL 617 A % | TINUVIN 292 % | TINUVIN 1130 % | Total % |
| --- | --- | --- | --- | --- |
| 6 | 99.0 | 0.50 | 0.50 | 100 |
| 7 | 98.65 | 0.675 | 0.675 | 100 |

Table 4 lists five examples of the film created using Example 5 as the top layer, Example 7 as the bottom layer at various thickness of each layer.

Examples 8 to 12

Films

TABLE 4

| Example No. | Thickness of Top layer (mil) | Thickness of Bottom Layer (mil) |
| --- | --- | --- |
| 8 | 0.75 | 0.75 |
| 9 | 1 | 0.5 |
| 10 | 1 | 1 |
| 11 | 1.33 | 0.66 |
| 12 | 2 | 0.5 |

Example 13 Control

HYBRIDUR 870 by itself was made into a film. When the film thickness is about 1.7 mils (43 microns), the tensile elongation is 80%. When the film thickness is about 2.4 mils (61 microns), the tensile elongation is around 150%. When subject to weather-o-meter test, the films show heavy shrinking.

Examples 8 to 12 have been tested for various properties. The films have been tested for film thickness, gloss at 60 degrees, and tensile elongation. For scratch resistance and shrinkage test, each sample is coated with about 30 gsm of a pressure sensitive adhesive under the trade name S8072 from Avery Dennison Corporation in Pasadena, Calif. For accelerated weathering and rivet testing, the adhesive coated sample is further laminated onto a printable film. The printable film is Example No. 29B in the PCT application PCT/US08/84812, which has been incorporated by reference herein in its entirety.

Table 5 lists the properties measured for each of the samples. All examples have passed the accelerated weathering test, have a gloss at 60 degree higher than 90, and tensile elongation higher than 200. All of the samples have passed the scratch resistance test, rivet testing, and shrinkage test.

TABLE 5

| Example No. | Total Thickness | Accelerated Weathering | Gloss @ 60 | Tensile Elongation | Rivet Testing | Shrinkage Test |
|---|---|---|---|---|---|---|
| 8 | 1.5 mils | Pass | >80 | >200 | Pass | Pass |
| 9 | 1.5 mils | Pass | >80 | >200 | Pass | Pass |
| 10 | 1.5 mils | Pass | >80 | >200 | Pass | Pass |
| 11 | 2.0 mils | Pass | >80 | >200 | Pass | Pass |
| 12 | 2.0 mils | Pass | >80 | >200 | Pass | Pass |

Example 13 Three-layer film

A three-layer film was created using HYBRIDUR 870 as the top layer, JONCRYL 617 A as the middle layer, and VINNAPAAS EF 811 as the third layer. Each layer can be from about 0.5 mil (12.7 microns) to about 2 mils (50.8 microns) thick.

Examples 14-17

Table 6 lists four additional examples of formulations used to create the top layer.

TABLE 6

| Example No. | Hybridur 870 | Tinuvin 400 DW | Tinuvin 123 DW | Texanol | DPnB | Zonyl FS300 | DI Water | UCAR Polyphobe 102 | Rheolate 350 |
|---|---|---|---|---|---|---|---|---|---|
| 14 | 89.56% | 0.91% | 0.73% | 1.41% | 1.41% | 0.28% | 4.70% | 0.99% | |
| 15 | 86.25% | 0.88% | 0.70% | 1.36% | 1.36% | | 9.27% | 0.18% | |
| 16 | 85.56% | 0.87% | 0.69% | 1.35% | 1.35% | | 9.6% | 0.18% | 0.40% |
| 17 | 85.56% | 0.87% | 0.69% | 1.35% | 1.35% | | 9.59% | 0.58% | |

Examples 18-22

Table 7 lists five additional examples of formulations used to create the bottom layer.

TABLE 7

| Example No. | Joncryl 1987 | Tinuvin 292 | Tinuvin 1130 | UCAR Polyphobe 102 | DI Water | Zonyl FS300 | Texanol | Acronal NX4612X |
|---|---|---|---|---|---|---|---|---|
| 18 | 98.85% | 0.45% | 0.45% | 0.05% | 0.05% | 0.15% | 0.0 | 0.0 |
| 19 | 99.05% | 0.45% | 0.45% | 0.025% | 0.025% | 0.0 | 0.0 | 0.0 |
| 20 | 0.0 | 0.50% | 0.50% | 0.10% | 0.10% | 0.0 | 2.88% | 95.93% |
| 21 | 49.53% | 0.42% | 0.42% | 0.05% | 0.05% | 0.0 | 0.0 | 49.53% |
| 22 | 74.30% | 0.42% | 0.42% | 0.05% | 0.05% | 0.0 | 0.0 | 24.77 |

All patents, published applications, and articles noted herein are hereby incorporated by reference in their entirety.

All of the features disclosed in the specification, including the claims, abstract, and drawings, and all of the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed is:

1. An optically transparent protective film comprising:
    a top layer;
    a bottom layer having a first surface and a second surface, wherein a surface area of the first surface is substantially coextensive and in continuous physical contact with the top layer; and
    an adhesive layer in contact with the second surface of the bottom layer, the adhesive layer including a pressure sensitive adhesive;
    wherein the top layer comprises at least 85.56% of a material selected from the group consisting of a polyurethane-acrylic copolymer and a urethane-acrylic hybrid polymer; and
    wherein the bottom layer is comprised of a non-polyvinylchloride (non-PVC) based polymer,
    wherein the film (i) passes an accelerated weathering test, (ii) exhibits a gloss at 60 degrees greater than 90, and (iii) exhibits a tensile elongation greater than 200%,
    wherein passing the accelerated weathering test requires that after weathering, the film not exhibit any visible changes after 2,000 hours and ΔE is less than 10.

2. The film as recited in claim 1, wherein the non-PVC based polymer is selected from the group consisting of an emulsion based polymer, a solvent based polymer, and an extruded polymer.

3. The film as recited in claim 1, wherein the non-PVC based polymer is an acrylic polymer.

4. The film as recited in claim 1, further including at least one additive in at least one of the top and bottom layers of the film.

5. The film as recited in claim 4 wherein the at least one additive is selected from the group consisting of UV stabilizing agents, free-radical scavengers, cross-linking agents, thickeners, flow and leveling agents, rheology modifiers, surfactants, defoamers, dispersants, wetting agents, dyes, pigments, co-solvents, water, isopropyl alcohol and combinations thereof.

6. The film as recited in claim 1, wherein the material is a polyurethane-acrylic copolymer.

7. The film as recited in claim 1, wherein the material is created by a process comprising:
    forming an acrylic polymer in the presence of a polyurethane dispersion.

8. The film as recited in claim 1, wherein the material is created from a waterborne dispersion produced by a process comprising:
    forming a polyurethane prepolymer;
    adding acrylic monomers to the polyurethane prepolymer; and
    simultaneously polymerizing the acrylic monomers and the polyurethane prepolymer.

9. A transparent film laminate comprising:
    a top layer;
    a bottom layer having a first surface and a second surface, wherein a surface area of the first surface is in continuous physical contact with the top layer;
    an intermediate layer in continuous physical contact with the second surface bottom layer;
    a substrate layer in physical contact with the intermediate layer, and
    wherein the top layer comprises a material selected from the group consisting of a polyurethane-acrylic copolymer and a urethane-acrylic hybrid polymer, and the top layer has a thickness in a range from 0.5 mil (12.7 microns) to 5 mils (127 microns);
    the bottom layer includes a non-PVC based polymer;
    and the substrate layer having printed or image indicia thereon.

10. The film laminate as recited in claim 9, wherein the intermediate layer is selected from a group including an adhesive layer, a tie coating layer and an adhesive promotion layer.

11. The film laminate as recited in claim 9, further including at least one additive in at least one of the top, intermediate and bottom layers of the film.

12. The film laminate as recited in claim 11 wherein the at least one additive is selected from the group consisting of UV stabilizing agents, free-radical scavengers, cross-linking agents, thickeners, flow and leveling agents, rheology modifiers, surfactants, defoamers, dispersants, wetting agents, dyes, pigments, co-solvents, water, isopropyl alcohol and combinations thereof.

13. An advertising or informational graphic, comprising:
    a surface layer having promotional indicia provided thereon;
    a film including a first layer, a second layer having a first surface and a second surface, wherein a surface area of the first surface is in continuous physical contact with the first layer, and an adhesive layer beneath the second layer on the second surface of the second layer;
    wherein the adhesive layer is in contact with the second surface layer; and
    wherein the first layer includes at least 85.56% of a urethane-acrylic hybrid polymer and the second layer includes a non-PVC based polymer,
    wherein the film (i) passes an accelerated weathering test, (ii) exhibits a gloss at 60 degrees greater than 90, and (iii) exhibits a tensile elongation greater than 200%,
    wherein passing the accelerated weathering test requires that after weathering, the film not exhibit any visible changes after 2,000 hours and ΔE is less than 10.

14. An advertising or informational graphic, comprising:
    a surface;
    an adhesive layer;
    a printable substrate having front and back faces, with the back face facing the surface and in contact with the adhesive layer and the front face having promotional indicia provided thereon;

a transparent film having a top layer and a bottom layer, with the bottom layer facing the front face of the printable substrate; and wherein the top layer comprises at least 85.56% of a material selected from the group consisting of a polyurethane-acrylic copolymer and a urethane-acrylic hybrid polymer; and wherein the bottom layer includes a material selected from the group consisting of a polyurethane-acrylic copolymer, a urethane-acrylic hybrid polymer, a styrene acrylic polymer, and a vinyl acetate ethylene copolymer, wherein the film (i) passes an accelerated weathering test, (ii) exhibits a gloss at 60 degrees greater than 90, and (iii) exhibits a tensile elongation greater than 200%, wherein passing the accelerated weathering test requires that after weathering, the film not exhibit any visible changes after 2,000 hours and $\Delta E$ is less than 10.

15. The advertising graphic as recited in claim 14, wherein the adhesive layer includes a removable adhesive.

16. The advertising graphic as recited in claim 14, wherein the promotional indicia is selected from the group consisting of alpha and/or numeric characters, images and combinations thereof.

17. The advertising graphic as recited in claim 14, wherein a second substrate layer is provided over one of the top layer and the bottom layer.

18. The advertising graphic as recited in claim 17, wherein the second substrate layer includes an ink layer.

19. The advertising graphic as recited in claim 14, further including at least one additive in at least one of the top and bottom layers of the film.

20. The advertising graphic as recited in claim 19, wherein the at least one additive is selected from the group consisting of UV stabilizing agents, free-radical scavengers, cross-linking agents, thickeners, flow and leveling agents, rheology modifiers, surfactants, defoamers, dispersants, wetting agents, dyes, pigments, co-solvents, water, isopropyl alcohol and combinations thereof.

21. A roll or sheet of graphic advertising film, comprising;

a film having at least first and second layers, the first layer includes at least 85.56% of a urethane-acrylic hybrid polymer and the second layer includes a polyurethane-acrylic copolymer, a urethane-acrylic hybrid polymer, a styrene acrylic polymer, or a vinyl acetate ethylene copolymer; and one of the first and second layers is provided in operative association with advertising indicia, wherein the film (i) passes an accelerated weathering test, (ii) exhibits a gloss at 60 degrees greater than 90, and (iii) exhibits a tensile elongation greater than 200%, wherein passing the accelerated weathering test requires that after weathering, the film not exhibit any visible changes after 2,000 hours and $\Delta E$ is less than 10.

22. The roll or sheet of graphic advertising film as recited in claim 21, where in the film further includes an adhesive layer provided on one of the first and second layers.

23. The roll or sheet of graphic advertising film as recited in claim 22, wherein a release layer is provided over the adhesive layer.

24. The roll or sheet of graphic advertising film as recited in claim 21, wherein the film further includes a substrate layer provided over one of the first and second layers.

25. The roll or sheet of graphic advertising film as recited in claim 24, wherein the substrate layer includes a print layer.

26. The roll or sheet of graphic advertising film as recited in claim 21, further including at least one additive in at least one of the first and second layers of the film.

27. The roll or sheet of graphic advertising film as recited in claim 26 wherein the at least one additive is selected from the group consisting of UV stabilizing agents, free-radical scavengers, cross-linking agents, thickeners, flow and leveling agents, rheology modifiers, surfactants, defoamers, dispersants, wetting agents, dyes, pigments, co-solvents and combinations thereof.

* * * * *